United States Patent
Lin et al.

(10) Patent No.: US 12,293,197 B2
(45) Date of Patent: May 6, 2025

(54) CONFIGURATION FILE GENERATION METHOD AND APPARATUS, ELECTRONIC DEVICE, MEDIUM AND PROGRAM PRODUCT

(71) Applicant: Beijing Zitiao Network Technology Co., Ltd., Beijing (CN)

(72) Inventors: Shuchao Lin, Beijing (CN); Xinghua Zhang, Beijing (CN); Denghui Wang, Beijing (CN); Zhengming Yan, Beijing (CN); Yuan Wu, Beijing (CN); Xuyue Han, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/912,357

(22) Filed: Oct. 10, 2024

(65) Prior Publication Data
US 2025/0036429 A1    Jan. 30, 2025

Related U.S. Application Data

(63) Continuation of application No. PCT/CN2023/090593, filed on Apr. 25, 2023.

(30) Foreign Application Priority Data

Apr. 25, 2022 (CN) .......................... 202210440323.7

(51) Int. Cl.
  *G06F 9/44* (2018.01)
  *G06F 9/445* (2018.01)
  *G06T 11/00* (2006.01)
(52) U.S. Cl.
  CPC .......... *G06F 9/44505* (2013.01); *G06T 11/00* (2013.01); *G06T 2200/24* (2013.01)

(58) Field of Classification Search
  CPC .................................... G06F 1/32; G06F 9/44
  See application file for complete search history.

(56) References Cited

U.S. PATENT DOCUMENTS

| | | | |
|---|---|---|---|
| 10,902,057 B2 | 1/2021 | Kato | |
| 2013/0230251 A1* | 9/2013 | Kondo | ..................... G06T 11/00 382/190 |
| 2018/0157686 A1* | 6/2018 | Zhang | ................... G06F 16/986 |

FOREIGN PATENT DOCUMENTS

| | | |
|---|---|---|
| CN | 113240777 A | 8/2021 |
| CN | 113709549 A | 11/2021 |
| CN | 113891140 A | 1/2022 |

OTHER PUBLICATIONS

ISA China Intellectual Property Administration, International Search Report Issued in Application No. PCT/CN2023/090593, Jul. 31, 2023, 5 pages. (Submitted with partial English translation).

* cited by examiner

*Primary Examiner* — Keshab R Pandey
(74) *Attorney, Agent, or Firm* — Alleman Hall & Tuttle LLP

(57) ABSTRACT

The present application relates to a configuration file generation method and apparatus, an electronic device, a medium and a program product. The method is applied to a shooting application and comprises: in response to a creation operation, displaying a creation interface, the creation interface comprising a preset material set used for generating a configuration file; in response to a material selection operation, selecting one or more raw materials from the material set; in response to an editing operation for the raw material(s), editing layer information of a layer corresponding to the raw material(s), rendering a generated first target material and displaying same; and, in response to a generation operation, on the basis of layer information of layer corresponding to the first target material, generating a first target configuration file used for image editing.

20 Claims, 4 Drawing Sheets

CONFIGURATION FILE GENERATION METHOD AND APPARATUS, ELECTRONIC DEVICE, MEDIUM AND PROGRAM PRODUCT

CROSS-REFERENCE TO RELATED APPLICATIONS

The present application is a continuation of International application No. PCT/CN2023/090593 filed on Apr. 25, 2023, which claims the priority to the Chinese application No. 202210440323.7 filed on Apr. 25, 2022, and entitled "CONFIGURATION FILE GENERATION METHOD AND APPARATUS, ELECTRONIC DEVICE, MEDIUM AND PROGRAM PRODUCT", the disclosure of which is incorporated by reference herein in its entirety.

TECHNICAL FIELD

The present application relates to the technical field of Internet, and in particular, to a configuration file generation method and apparatus, an electronic device, a medium and a program product.

BACKGROUND

With the development of the Internet, more and more users upload shot photos or videos to a social website to share their own work and life. In order to beautify the photos or increase interest, most cameras provide effects such as stickers or props for the users to use, so as to achieve an effect of beauty.

SUMMARY

The present application provides a method and apparatus for generating configuration file for image edition, an electronic device, a medium and a program product.

According to a first aspect of the present application, there is provided a method for generating configuration file for image edition, applied to a shooting application, comprising:
  in response to a creation operation, displaying a creation interface, the creation interface comprising a preset material set for generating a configuration file;
  in response to a material selection operation, selecting one or more raw materials from the material set, wherein, layer information of a layer corresponding to a single one of the raw material comprises: effect rendering information, material resource information and trigger information, the effect rendering information being configured for recording key information in rendering the raw material, and the trigger information being configured for recording control information of triggering displaying or hiding the layer corresponding to the raw material;
  in response to an editing operation for the raw material, editing the layer information of the layer corresponding to the raw material, generating a first target material, and rendering and displaying layer information of a layer corresponding to the first target material; and
  in response to a generation operation, on the basis of the layer information of the layer corresponding to the first target material, generating a first target configuration file for image edition, the first target configuration file being configured for rendering the layer information of the layer corresponding to the first target material on a shot image.

In some embodiments, the method further comprises:
  in response to a publishing operation of a user for the first target configuration file, uploading the first target configuration file to a first server, wherein, the first target configuration file is configured for being downloaded by another user and rendering the layer information of the layer corresponding to the first target material on an image shot by the other user.

In some embodiments, the method further comprises:
  storing the layer information of the layer corresponding to the first target material into a target project file;
  in response to the publishing operation of the user for the first target configuration file, uploading the target project file to the first server, wherein, the target project file is configured for being downloaded by the other user and editing the layer information of the layer corresponding to the first target material into layer information of a layer corresponding to a second target material to generate a second target configuration file.

In some embodiments, the target project file comprises: an effect rendering file, a resource information file and a trigger information file,
  wherein, the effect rendering file is configured for storing effect rendering information of the first target material, the resource information file is configured for storing material resource information of the first target material, and the trigger information file is configured for storing trigger information of the first target material.

In some embodiments, the target project file comprises original storage path information of the first target material,
  wherein, the original storage path information is configured for being updated to local storage path information after the target project file is downloaded by the other user.

In some embodiments, the method further comprises:
  when the first target configuration file is uploaded to the first server, uploading configuration file information corresponding to the first target configuration file to a second server,
  wherein, the configuration file information comprises unique identification information of the first target configuration file.

In some embodiments, the effect rendering information comprises one or more of: a rendering type, a rendering level, first identification information representing whether the layer is visible, second identification information representing whether the layer is a mirror image, a layer rotation angle, a layer transparency, position coordinates of the layer, or a proportion of the rendering of the layer in a screen.

In some embodiments, the material resource information is configured for recording resource description information of the raw material; and the material resource information comprises: a material type and a material source.

In some embodiments, the trigger information comprises: a trigger type and a trigger action.

According to a second aspect of the present application, there is provided an image editing method, comprising:
  in response to a downloading operation for a first target configuration file, downloading the first target configuration file from a first server, wherein, the first target configuration file is generated by editing layer information of a layer corresponding to a raw material into layer information of a layer corresponding to a first target material, the layer information corresponding to a single one of the raw material comprising: effect rendering information, material resource information and trigger information, the effect rendering information being configured for recording key information in rendering the raw material, and the trigger information being configured for recording control information of triggering displaying or hiding the layer corresponding to the raw material; and rendering the layer information of the layer corresponding to the first target material on a shot image by using the first target configuration file.

In some embodiments, after downloading the first target configuration file from the first server, in response to a modification operation for the first target configuration file, downloading a target project file from the first server to display the first target material on a creation interface, the target project file having therein stored the layer information of the layer corresponding to the first target material, in response to an editing operation for the first target material, editing the layer information of the layer corresponding to the first target material, generating a second target material, and rendering and displaying layer information of a layer corresponding to the second target material; and in response to a generation operation, on the basis of the layer information of the layer corresponding to the second target material, generating a second target configuration file.

According to a third aspect of the present application, there is provided an apparatus for generating configuration file for image edition, applied to a shooting application, comprising:

a creation interface display module configured to, in response to a creation operation, display a creation interface, the creation interface comprising a preset material set for generating a configuration file;

a raw material selection module configured to, in response to a material selection operation, select one or more raw materials from the material set, wherein, layer information of a layer corresponding to a single one of the raw material comprises: effect rendering information, material resource information and trigger information, the effect rendering information being configured for recording key information in rendering the raw material, and the trigger information being configured for recording control information of triggering displaying or hiding the layer corresponding to the raw material a first target material generation module configured to, in response to an editing operation for the raw material, edit the layer information of the layer corresponding to the raw material, generate a first target material, and render and display layer information of a layer corresponding to the first target material;

a first target configuration file generation module configured to, in response to a generation operation, on the basis of the layer information of the layer corresponding to the first target material, generate a first target configuration file for image edition, the first target configuration file being configured for rendering the layer information of the layer corresponding to the first target material on a shot image.

In some embodiments, the apparatus for generating configuration file for image edition further comprises:

a configuration file uploading module configured to, in response to a publishing operation of a user for the first target configuration file, upload the first target configuration file to a first server, wherein, the first target configuration file is configured for being downloaded by another user and rendering the layer information of the layer corresponding to the first target material on an image shot by the other user.

In some embodiments, the apparatus for generating configuration file for image edition further comprises:

a target project file generation module configured to store the layer information of the layer corresponding to the first target material into a target project file;

a target project file uploading module configured to, in response to the publishing operation of the user for the first target configuration file, upload the target project file to the first server, wherein, the target project file is configured for being downloaded by the other user and editing the layer information of the layer corresponding to the first target material into layer information of a layer corresponding to a second target material to generate a second target configuration file.

In some embodiments, the target project file comprises: an effect rendering file, a resource information file and a trigger information file, wherein, the effect rendering file is configured for storing effect rendering information of the first target material, the resource information file is configured for storing material resource information of the first target material, and the trigger information file is configured for storing trigger information of the first target material.

In some embodiments, the target project file comprises original storage path information of the first target material, wherein, the original storage path information is configured for being updated to local storage path information after the target project file is downloaded by the other user.

In some embodiments, the apparatus for generating configuration file for image edition further comprises:

a configuration file information uploading module configured to, when the first target configuration file is uploaded to the first server, upload configuration file information corresponding to the first target configuration file to a second server, wherein, the configuration file information comprises unique identification information of the first target configuration file.

In some embodiments, the effect rendering information comprises one or more of: a rendering type, a rendering level, first identification information representing whether the layer is visible, second identification information representing whether the layer is a mirror image, a layer rotation angle, a layer transparency, position coordinates of the layer, or a proportion of the rendering of the layer in a screen.

In some embodiments, the material resource information is configured for recording resource description information of the raw material; and the material resource information comprises: a material type and a material source.

In some embodiments, the trigger information comprises: a trigger type and a trigger action.

According to a fourth aspect of the present application, there is provided an electronic device, comprising: a memory and a processor, the processor being configured to execute a computer program stored in the memory, the computer program, when executed by the processor, implementing the method for generating configuration file for image edition according to the first aspect or the image editing method according to the second aspect.

According to a fifth aspect of the present application, there is provided a computer-readable storage medium having thereon stored a computer program, the computer program, when executed by a processor, implementing the method for generating configuration file for image edition according to the first aspect or the image editing method according to the second aspect.

According to a sixth aspect of the present application, there is provided a computer program product which, when run on a computer, causes the computer to perform the method for generating configuration file for image edition according to the first aspect or the image editing method according to the second aspect.

According to a seventh aspect of the present application, there is provided a computer program comprising instructions which, when executed by a processor, cause the processor to perform the method for generating configuration file for image edition according to the first aspect or the image editing method according to the second aspect.

BRIEF DESCRIPTION OF THE DRAWINGS

The accompanying drawings here, which are incorporated in and constitute a part of this specification, illustrate embodiments consistent with the present application and, together with the description, serve to explain the principles of the present application.

In order to more clearly illustrate the technical solutions in the embodiments of the present application or the related art, the drawings that need to be used in the description of the embodiments or the related art will be briefly described below, and it is obvious that for those skilled in the art, other drawings can be obtained according to these drawings without paying creative labor.

DETAILED DESCRIPTION

Figure 1:
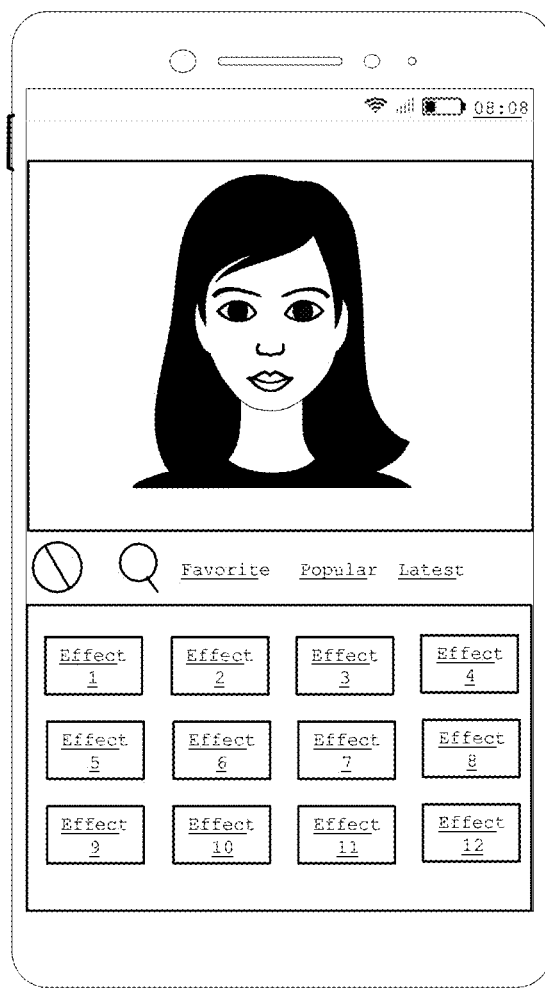
FIG. 1 is a schematic diagram of an application scenario according to some embodiments of the present application.

In order that the above objectives, features and advantages of the present application may be more clearly understood, the solutions of the present application will be further described below. It should be noted that, without conflict, the embodiments of the present application and features in the embodiments may be combined with each other.

In the following description, numerous specific details are set forth in order to provide a thorough understanding of the present application, but the present application may be implemented in other ways than those described herein; and it is obvious that the embodiments described in this description are only part of the embodiments of the present application, rather than all of them.

In the related art, developers may employ a desktop tool (e.g., PhotoShop, etc.) to make an effect, upload the effect to a server, and finally distribute the effect to a camera for a user to use. However, the effect made by the developers is usually fixed, so that the user can only adjust part of the effect, such as filter intensity, and beauty intensity, which cannot meet the requirements of the user.

Compared with the related art, the technical solution provided in some embodiments of the present application has the following advantages.

In a shooting application, an entry to creating a configuration file for image edition (i.e., an effect of beautifying an image) is provided, so that a user can customize a configuration file through the entry according to his own needs. The shooting application may, in response to a creation operation, display a creation interface, which comprises a preset material set for generating a configuration file, such as filters, beauty, and music. The user can select appropriate materials, combine and adjust different types of materials, to customize the configuration file. The shooting application, in response to a material selection operation, selects one or more raw materials from the material set; in response to an editing operation for the raw material, edits layer information of a layer corresponding to the raw material, for example, edits effect rendering information (which is configured for recording key information in rendering the raw material), material resource information, trigger information (which is configured for recording control information of triggering displaying or hiding the layer corresponding to the raw material), and the like, to generate a first target material, and render and display layer information of layer corresponding to the first target material. In this way, the user can adjust the overall effect at any time. In response to a generation operation, a first target configuration file is generated on the basis of the layer information of the layer corresponding to the first target material. In this way, when the user shoots an image, the layer information of the layer corresponding to the first target material can be rendered in the shot image, to improve the overall effect of the image. In some embodiments of the present application, the configuration file for image edition can be completed in the shooting application, and the user can customize the configuration file according to requirements to improve flexibility of configuration file generation, thereby enhancing user experience.

Reference is made to FIG. 1, which is a schematic diagram of an application scenario according to some embodiments of the present application. When a user takes a shot through a shooting application, the shooting application can provide various configuration files for image edition for the user to use, so as to improve a shooting effect. The configuration file for image edition includes a popular configuration file for image edition, a latest configuration file for image edition, and the like, and the user can download and use a configuration file for image edition of interest, and can also collect the configuration file for image edition of interest. However, the above configuration file for image edition is a fixed configuration file for image edition that is pre-designed by developers, so that the user cannot freely adjust a beauty effect of the configuration file for image edition.

In order to solve the above problems, some embodiments of the present application provide a method and apparatus for generating configuration file for image edition, an electronic device, a medium and a program product, so as to improve flexibility of configuration file generation, thereby improving flexibility of a beauty effect. Moreover, the cost of making the configuration file can be reduced.

Figure 2:
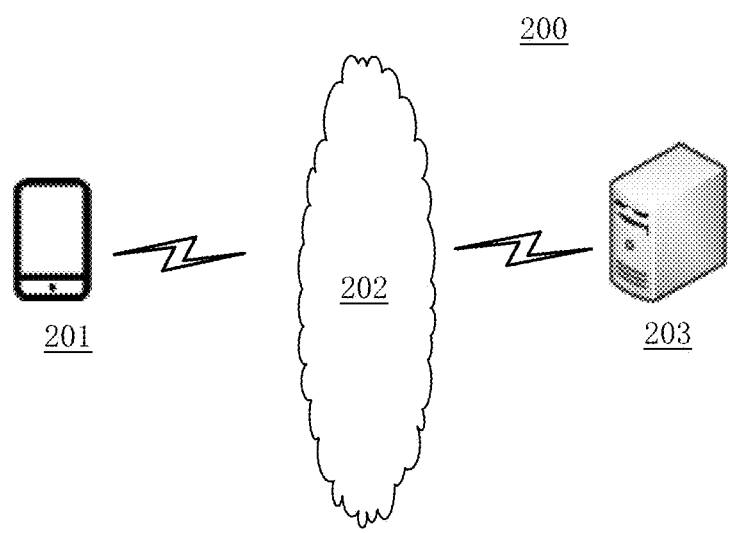
FIG. 2 is a schematic diagram of a system architecture of an exemplary application environment that can be applied to a method for generating configuration file for image edition according to some embodiments of the present application.

FIG. 2 is a schematic diagram of a system architecture of an exemplary application environment that can be applied to a method for generating configuration file for image edition according to some embodiments of the present application.

As shown in FIG. 2, the system architecture 200 includes: a terminal device 201, a network 202 and a server 203. The network 202 serves to provide a medium for a communication link between the terminal device 201 and the server 203. The network 202 may include various connection types, such as wired and wireless communication links, or optical fiber cables. The terminal device 201 includes, but is not limited to, a desktop, laptop, smartphone, tablet, and the like, and the terminal device 201 has therein installed a shooting application, through which a user can shoot a photo or a video. The server 203 may be a server corresponding to the shooting application.

It should be understood that the number of the terminal device, network, and server in FIG. 2 is merely illustrative. There may be any number of terminal devices, networks, and servers, according to implementation requirements. For example, the server 203 may be a server cluster formed by a plurality of servers.

The method for generating configuration file for image edition provided in some embodiments of the present application may be executed by the shooting application in the terminal device 201, and accordingly, the apparatus for generating configuration file for image edition may be provided in the shooting application in the terminal device 201. For example, the shooting application in the terminal device 201 provides an entry allows for customizing generation of a configuration file for image edition, through which the user can customize generation of the configuration file for image edition. The user may also upload a customized configuration file for image edition to the server 203 for another user to use.

In addition, when the configuration file for image edition is uploaded, a project file corresponding to the configuration file, which is locally generated by the user, may also be uploaded to the server 203. When other users want to simply adjust the configuration file, the corresponding project file can be downloaded, so that secondary editing can be performed on the configuration file for image edition, and finally a configuration file for image edition in which the other users are interested is generated. In this way, it is possible to reduce the complexity of generating the configuration file for image edition by the other users, and improve the efficiency of the generation of the configuration file. With the above method, the server 203 can contain many configuration files for image edition that are customized by the users, so that the cost of making the configuration file by the developers of the shooting application can be reduced.

Figure 3:
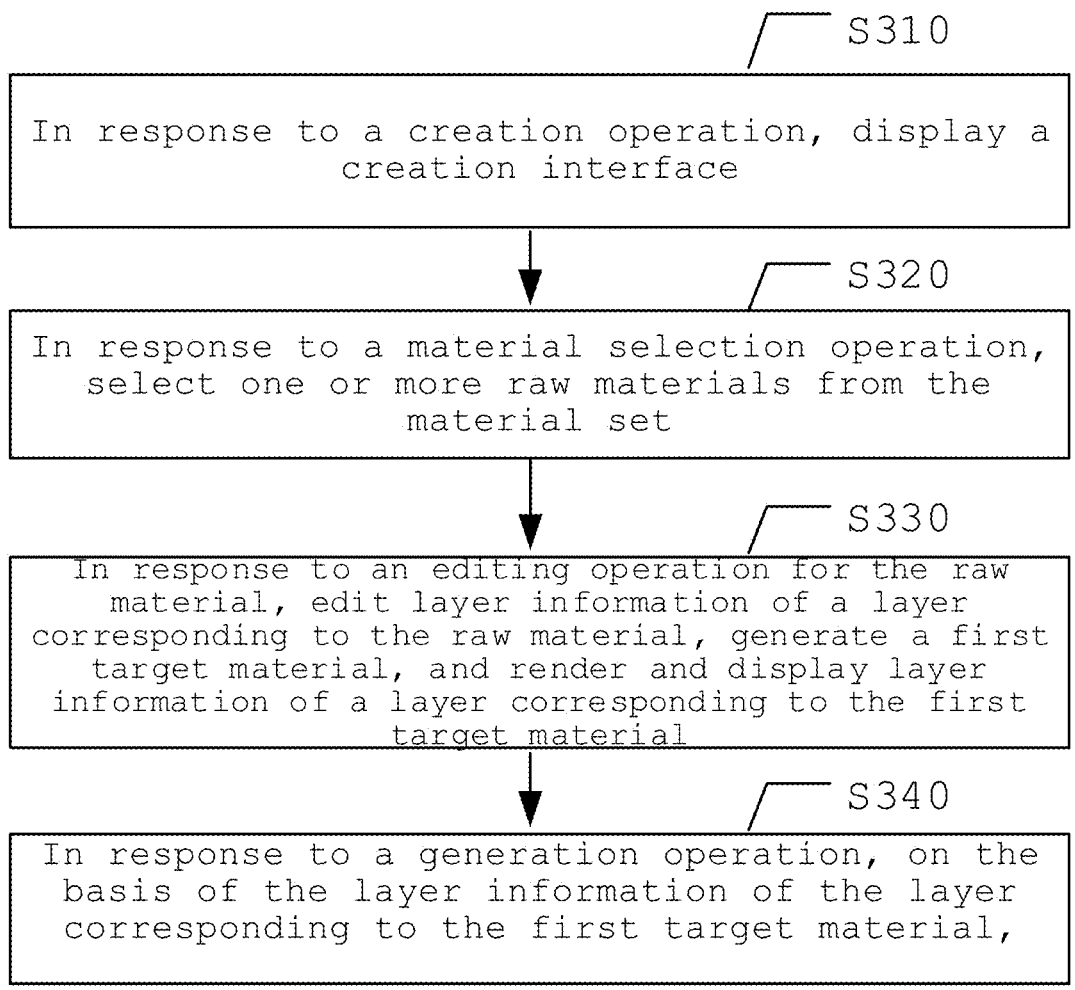
FIG. 3 is a flow diagram of a method for generating configuration file for image edition according to some embodiments of the present application.

Reference is made to FIG. 3, which is a flow diagram of a method for generating configuration file for image edition according to some embodiments of the present application, wherein the method is applied to a shooting application, and may comprise:

step S310, in response to a creation operation, displaying a creation interface.

In some embodiments of the present application, after the user opens the shooting application, the user may, by clicking a "Camera" button, enter a shooting interface where a configuration file (for example, a sticker, a prop, and other effects for beautifying an image) for image edition that is pre-made by developers may be provided for the user, and the user may select a configuration file of interest when shooting an image, so as to render the image shot by the user.

An entry to making a configuration file for image edition may be provided in the shooting application, for example, a button for making a configuration file may be provided in the shooting interface. If the user is not interested in any of the configuration files provided in the shooting interface, a configuration file of interest can be made through the entry. After the user clicks the button for making a configuration file, the shooting application may display a creation interface in response to a creation operation. It should be noted that, an entry to making a configuration file for image edition may be provided in another interface of the shooting application, which is not limited in the present application.

The creation interface comprises a preset material set for generating the configuration file. The material set includes a plurality of different types of raw materials. The raw materials are pre-made by the developers, and the types of the raw materials can include: filter, beauty, foreground sticker, face-following sticker, panel sticker, effect, text, animation, music, etc.

Step S320, in response to a material selection operation, selecting one or more raw materials from the material set.

The user can select appropriate materials, and combine and adjust different types of materials, to make the configuration file for image edition. For example, one or more of the raw materials may be selected as needed. Each raw material may have a corresponding layer, and layer information of the layer corresponding to a single raw material comprises: effect rendering information, material resource information and trigger information. The effect rendering information is configured for recording key information in rendering the raw material, such as a rendering type, and a rendering level. The trigger information is configured for recording control information of triggering displaying or hiding the layer corresponding to the raw material, that is, when the user performs a certain action (opening a mouth, shaking a head, nodding, etc.), displaying the layer corresponding to the raw material is triggered, or hiding the layer corresponding to the raw material is triggered.

Step S330, in response to an editing operation for the raw material, editing the layer information of the layer corresponding to the raw material, generating a first target material, and rendering and displaying layer information of layer corresponding to the first target material.

For each raw material, the user may edit the raw material, and editing the raw material is editing the layer information of the layer corresponding to the raw material, for example, modifying a rendering level, modifying a layer transparency, and the like. For different types of raw materials, different editing operations may be performed. For example, when the type of the raw material is a filter, the intensity of the filter can be edited; and when the type of the raw material is text, content of the text is edited, and the like. The raw material is updated into the first target material through the editing operation.

It can be understood that, after the first target material is generated, layer information of a layer corresponding to the first target material may be rendered and displayed, so that a beauty effect is fed back to the user, making it convenient for the user to make timely adjustment. If the user is not satisfied, the editing operation can be continuously performed to finally obtain a satisfactory effect. If the user is satisfied, the following step S340 may be performed.

Step S340, in response to a generation operation, on the basis of the layer information of the layer corresponding to the first target material, generating a first target configuration file, the first target configuration file being configured for rendering the layer information of the layer corresponding to the first target material on a shot image.

The creation interface also includes a button for generating the configuration file for image edition, such as a "Finish" button, the user clicking the button indicating that the user has finished the editing operation and a generation operation is performed. The shooting application may, in response to the generation operation, on the basis of the layer information of the layer corresponding to the first target material, generate a first target configuration file. The first target configuration file can be displayed on the shooting interface, and can be displayed together with the configuration file for image edition that is pre-made by the developers, and an interface can also be newly added specially for storing a configuration file customized by the user. For example, a "Favorite" button, a "Popular" button, and a "Latest" button shown in FIG. 1 correspond to different interfaces, each interface having a corresponding configuration file. A "Customize" button can be added, whose corresponding interface can therein stored a configuration file customized by the user.

In the method for generating configuration file for image edition of some embodiments of the present application, an entry to creating a configuration file for image edition (i.e., an effect of beautifying an image) is provided in a shooting application, so that a user can customize the configuration file for image edition through the entry according to his own needs. The shooting application may, in response to a creation operation, display a creation interface, the creation interface including a preset material set for generating a configuration file, such as filters, beauty, music, etc. The user may select appropriate materials, and combine and adjust different types of materials to customize the configuration file. The shooting application, in response to a material selection operation, selects one or more raw materials from the material set; in response to an editing operation for the raw material, edits layer information of a layer corresponding to the raw material, for example, editing effect rendering information (which is configured for recording key information in rendering the raw material), material resource information, trigger information (which is configured for recording control information of triggering displaying or hiding the layer corresponding to the raw material), and the like, to generate a first target material, and render and display layer information of a layer corresponding to the first target material. In this way, the user can adjust the overall effect at any time. In response to a generation operation, a first target configuration file is generated on the basis of the layer information of the layer corresponding to the first target material. In this way, when the user shoots an image, the layer information of the layer corresponding to the first target material can be rendered in the shot image, to improve the overall effect of the image. In some embodiments of the present application, the configuration file for image edition can be made in the shooting application, and the user can customize the configuration file according to requirements to improve the flexibility of configuration file generation, thereby improving the user experience.

Figure 4:
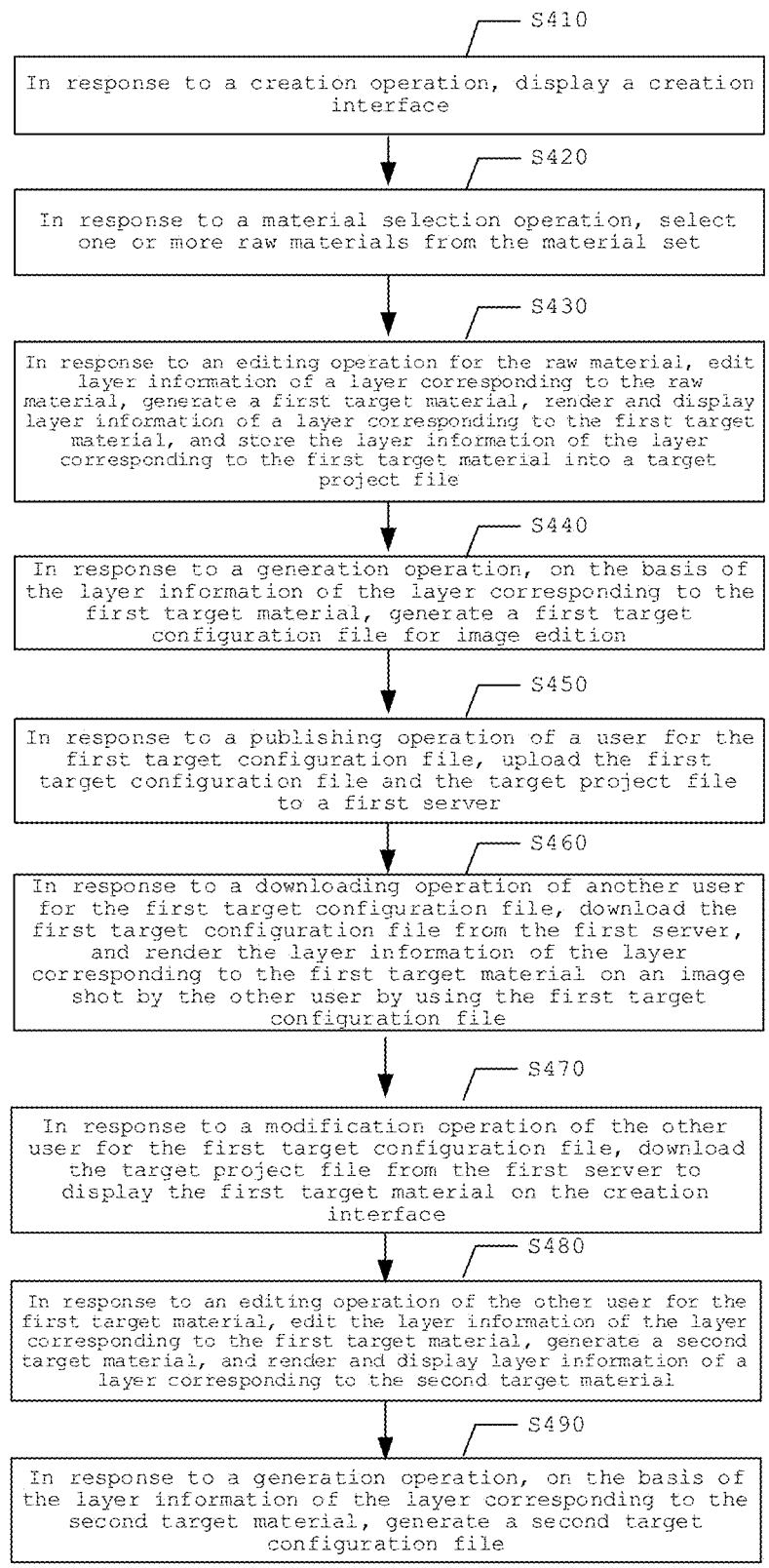
FIG. 4 is yet another flow diagram of a method for generating configuration file for image edition according to some embodiments of the present application.

Reference is made to FIG. 4, which is another flow diagram of a method for generating configuration file for image edition according to some embodiments of the present application, comprising the following steps:

step S410, in response to a creation operation, displaying a creation interface. The creation interface comprises a preset material set for generating a configuration file.

As described above, the material set may comprise a plurality of raw materials, each having a corresponding layer, and layer information of the layer corresponding to a single raw material includes, but is not limited to: effect rendering information, material resource information and trigger information. Of course, the division of the layer information is not limited to this.

The effect rendering information is configured for recording key information in rendering the raw material, which may comprise: a rendering type, a rendering level, first identification information representing whether the layer is visible, second identification information representing whether the layer is a mirror image, a layer rotation angle, a layer transparency, position coordinates of the layer, or a proportion of the rendering of the layer in a screen. Reference can be made to Table 1 for the definition of the effect rendering information:

TABLE 1

| Field Name | Type | Whether to be necessarily transmitted | Description |
| --- | --- | --- | --- |
| uuid | String | Yes | unique identification, for associating other information of the layer, such as material information and trigger information |
| path | String | Yes | material path, which is an absolute path in a storage file |
| type | String | Yes | layer rendering type, whose value may include:<br>FaceMakeupV2: face makeup;<br>LutFilter: Lut (Color look-up-table) filter;<br>sprite2D: 2D sticker;<br>sprite3D: 3D sticker; |
| order | Int | Yes | rendering level, the smaller the Order, the higher the rendering level |
| enable | Boolean | Yes | layer visible identification, "true" representing that the layer is visible, and "false" representing that the layer is invisible |
| mirror | Boolean | Yes | layer mirror image identification, "true" representing that the layer is a mirror image, and "false" representing that the layer is a non-mirror image |
| rotation | Float | Yes | layer rotation angle, with a value in [−180 degrees, 180 degrees] |

TABLE 1-continued

| Field Name | Type | Whether to be necessarily transmitted | Description |
|---|---|---|---|
| alpha | Float | Yes | layer transparency, with a value range of [0, 1], 0 representing that the layer is full transparent, 1 representing that the layer is non-transparent |
| x | Float | Yes | X-axis coordinate in a standard screen coordinate system |
| y | Float | Yes | Y-axis coordinate in the standard screen coordinate system |
| z | Float | Yes | Z-axis coordinate in the standard screen coordinate system |
| width | Float | Yes | screen width percentage, with a value in [0, 1] |
| height | Float | Yes | screen height percentage, with a value in [0, 1] |

The material resource information is configured for recording resource description information of the raw material, and the material resource information comprises: a material type and a material source, wherein the material type includes filter, beauty, effect, sticker, font, text_suit, animation, music and the like. The material source comprises: from a network effect platform or from the local. If the material comes from the local, a material source value can be included, which is configured for recording a relative path of the material. Reference can be made to Table 2 for the definition of material source description information of the single material.

TABLE 2

| Field Name | Type | Whether to be necessarily transmitted | Description |
|---|---|---|---|
| effectID | String | Yes | material id, which records an identification of the material on the resource platform and is configured for pulling resources from network |
| panelType | String | Yes | material type, whose value can include: filter, beauty, effect, sticker, font, text_suit, animation, music |
| source | String | Yes | material source, whose value contains: net: network effect platform local: locally imported |
| sourceValue | String | No | material source value, wherein for a locally imported material, the value can be configured for recording a relative path of the material |

The trigger information is configured for recording control information of triggering displaying or hiding the layer corresponding to the raw material, and the trigger information comprises: a trigger type and a trigger action, and may further comprise the number of times of presentation, a presentation time, and the like. Reference can be made to Table 3 for the definition of the trigger information.

TABLE 3

| Field Name | Type | Whether to be necessarily transmitted | Description |
|---|---|---|---|
| tiggerType | String | Yes | trigger type, whose value contains: blink: blink openMouth: open a mouth duckFace: block face shake: shake head nod: nod raiseEyebrow: raise eyebrows tap: tap a screen handAppera: a single hand appears bothHandApperaa: both hands appear heart: make a heart shape with one hand ok: gesture action of ok thumpUp: gesture action of victory none: none depend: depend on another trigger timer: depend on timeline |
| layeruuid | String | Yes | layer identification associated with a trigger action |
| action | String | Yes | trigger action, whose value contains: Show: display Hide: hide |
| times | Int | No | the number of times of presentation, which is a not necessarily transmitted parameter, not being transmitted representing 1 time |
| duration | Long | No | presentation duration with a unit of ms, which represents an effective time of the trigger action, e.g. layer A is displayed for 1 s after a blinking action occurs |

According to the above division, the above three types of information can be stored in different files respectively. In this way, when the developers modify the above information, they can conveniently find the corresponding content. Of course, the three types of information may be stored in one file.

In step S420, in response to a material selection operation, selecting one or more raw materials from the material set.

Step S430, in response to an editing operation for the raw material, editing layer information of a layer corresponding to the raw material, generating a first target material, rendering and displaying layer information of a layer corresponding to the first target material, and storing the layer information of the layer corresponding to the first target material into a target project file.

The process of creating the configuration file by the user is a process of creating a project, each configuration file corresponding to one project. Because each raw material has the layer information of the corresponding layer, each time the user selects one raw material, layer information of a layer corresponding to the raw material can be locally stored in a terminal device used by the user. A file where the layer information is stored may be referred to as a project file, wherein the effect rendering information, the material resource information, and the trigger information in the layer information may all have corresponding project files.

It can be understood that the layer information will be updated by the editing action of the user. For example, if one new filter layer is added by the user, and blinking display is set, the project files corresponding to the effect rendering information, the material resource information, and the trigger information can be updated at this time. Accordingly, when the raw material is edited and the first target material is generated, a target project file corresponding to the first target material can be generated at the same time. The target project file comprises: an effect rendering file, a resource information file and a trigger information file, wherein, the effect rendering file is configured for storing effect rendering information of the first target material, the resource information file is configured for storing material resource information of the first target material, and the trigger information file is configured for storing trigger information of the first target material.

Step S440, in response to a generation operation, on the basis of the layer information of the layer corresponding to the first target material, generating a first target configuration file for image edition, the first target configuration file being configured for rendering the layer information of the layer corresponding to the first target material on a shot image.

After the user finishes the editing operation, the shooting application may, on the basis of the layer information of the layer corresponding to the first target material, generate a first target configuration file, wherein the first target configuration file may be applied to a general rendering engine.

Step S450, in response to a publishing operation of the user for the first target configuration file, uploading the first target configuration file and the target project file to a first server.

After the user finishes editing and exports the first target configuration file, he can select to publish the first target configuration file to a cloud for another user to use. In some embodiments, in response to a publishing operation of the user for the first target configuration file, the first target configuration file may be uploaded to a first server, and another user may download the first target configuration file and render the layer information of the layer corresponding to the first target material on a shot image. When the first object configuration file is uploaded, a cover image, video presentation file and the like of the first object configuration file can be uploaded to the first server together.

In some embodiments, when the first target configuration file is uploaded, the target project file may also be uploaded to the first server at the same time, so that in the case of dissatisfaction of the other user with the first target configuration file, the target project file may be downloaded to modify the first target configuration file.

It can be understood that, when publishing the first target configuration file, the user may fill in publishing information corresponding to the first target configuration file, wherein the publishing information may include: a cover image, title, description information, video presentation (optional), prompt information (optional), and the like. File-type information (e.g. an image) in the publishing information can be converted into a resource uri (uniform resource identifier). In some embodiments, when the first target configuration file is uploaded to the first server, configuration file information corresponding to the first target configuration file may be uploaded to a second server.

The configuration file information may, in addition to the above publishing information, further include unique identification information of the first target configuration file, to establish a correspondence between the configuration file information and the first target configuration file. For example, hash signing may be applied to the first target configuration file to obtain a hash value of the first target configuration file, as unique identification information of the first target configuration file. By uploading the first target configuration file and the corresponding configuration file information to different servers, the security of the first target configuration file can be improved.

After the first target configuration file is uploaded to the first server, the first server may perform an automated test on the first target configuration file to test performance data of the first target configuration file, so as to ensure compliant matching of materials of the first target configuration file. After the test is passed, the first target configuration file is distributed to the shooting application for download and use by the user.

Step S460, in response to a downloading operation of the other user for the first target configuration file, downloading the first target configuration file from the first server, and rendering the layer information of the layer corresponding to the first target material on an image shot by the other user by using the first target configuration file.

After the first target configuration file is distributed to the shooting application, the other user can download and use the first target configuration file, that is, render the layer information of the layer corresponding to the first target material on the shot image, so as to improve the overall effect of the image.

Step S470, in response to a modification operation of the other user for the first target configuration file, downloading the target project file from the first server, to display the first target material on the creation interface.

If the other user does not like a certain material in the first target configuration file, the target project file (such as an effect rendering file, resource information file and trigger information file) corresponding to the first target configuration file can be downloaded to replace or delete the material. Through material resource information in the resource information file, a source and material identification of the material can be known, and the material can be pulled to the local through the material resource information to further modify the material. After the other user performs secondary editing on the first target configuration file, the first target configuration file can be stored locally for use.

In some embodiments, the target project file may comprise original storage path information of the first target material; since the target project file is locally stored in the terminal device used by the user, the original storage path information is local path information in the terminal device. After the target project file is downloaded from the first server by the other user, the storage path in the terminal device used by the other user may be different from that in the terminal device used by the user, so that the original storage path information can be updated to the local storage path information to ensure the correctness of the storage path.

Step S480, in response to an editing operation of the other user for the first target material, editing the layer information of the layer corresponding to the first target material, generating a second target material, and rendering and displaying layer information of a layer corresponding to the second target material.

Step S490, in response to a generation operation, on the basis of the layer information of the layer corresponding to the second target material, generating a second target configuration file.

The processing of the above steps S480 to S490 is similar to the processing of the above steps S430 to S440, so that reference may be specifically made to the description in the steps S430 to S440, which is not repeated here.

Similar to the first target configuration file, after the other user perform secondary editing to generate the second target configuration file, they may also select to upload the second target configuration file to the first server. Certainly, at the same time, the project file corresponding to the second target configuration file may also be uploaded to the first server. In this way, a user using the second target configuration file may modify the second target configuration file if the user is dissatisfied with it.

According to the method for generating configuration file for image edition of some embodiments of the present application, layer information of each raw material may be pre-defined to record information of each raw material, such as a filter effect, filter intensity, sticker information, sticker position information, sticker animation information, and the like. On the basis of interaction of a user with a shooting application, creation of a configuration file may be finished in the shooting application. After finishing the configuration file, the user can further publish the configuration file for another user to use, so that the cost of developing the configuration file by developers can be reduced. On the basis of the pre-defined layer information of the layer corresponding to each raw material, a project file corresponding to the configuration file can be generated at the same time, so that the other user can perform secondary editing on the configuration file, for example, he can conveniently replace a certain material in the configuration file, so that the efficiency of creating the configuration file by the other user can be improved.

Figure 5:
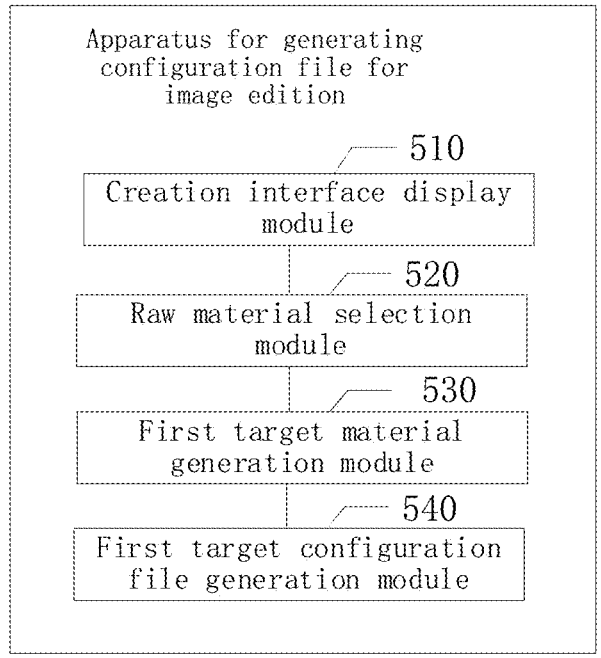
FIG. 5 is a schematic structural diagram of an apparatus for generating configuration file for image edition according to some embodiments of the present application.

Corresponding to the above method embodiments, some embodiments of the present application further provide an apparatus for generating configuration file for image edition; referring to FIG. 5, the apparatus 500 for generating configuration file for image edition, applied to a shooting application, comprises.

a creation interface display module 510 configured to, in response to a creation operation, display a creation interface, the creation interface comprising a preset material set for generating a configuration file;

a raw material selection module 520 configured to, in response to a material selection operation, select one or more raw materials from the material set, wherein, layer information of a layer corresponding to single raw material comprises: effect rendering information, material resource information and trigger information, the effect rendering information being configured for recording key information in rendering the raw material, and the trigger information being configured for recording control information of triggering displaying or hiding the layer corresponding to the raw material;

a first target material generation module 530 configured to, in response to an editing operation for the raw material, edit the layer information of the layer corresponding to the raw material, generate a first target material, and render and display layer information of a layer corresponding to the first target material; and a first target configuration file generation module 540 configured to, in response to a generation operation, on the basis of the layer information of the layer corresponding to the first target material, generate a first target configuration file for image edition, the first target configuration file being configured for rendering the layer information of the layer corresponding to the first target material on a shot image.

In some embodiments, the apparatus 500 for generating configuration file for image edition further comprises:

a configuration file uploading module configured to, in response to a publishing operation of a user for the first target configuration file, upload the first target configuration file to a first server, wherein, the first target configuration file is configured for being downloaded by another user and rendering the layer information of the layer corresponding to the first target material on an image shot by the other user.

In some embodiments, the apparatus 500 for generating configuration file for image edition further comprises:

a target project file generation module configured to, store the layer information of the layer corresponding to the first target material into a target project file; and a target project file uploading module configured to, in response to the publishing operation of the user for the first target configuration file, upload the target project file to the first server, wherein, the target project file is configured for being downloaded by the other user and editing the layer information of the layer corresponding to the first target material into layer information of a layer corresponding to a second target material to generate a second target configuration file.

In some embodiments, the target project file comprises: an effect rendering file, a resource information file and a trigger information file, wherein, the effect rendering file is configured for storing effect rendering information of the first target material, the resource information file is configured for storing material resource information of the first target material, and the trigger information file is configured for storing trigger information of the first target material.

In some embodiments, the target project file comprises original storage path information of the first target material, wherein, the original storage path information is configured for being updated to local storage path information after the target project file is downloaded by the other user.

In some embodiments, the apparatus 500 for generating configuration file for image edition further comprises:

a configuration file information uploading module, configured to upload configuration file information corresponding to the first target configuration file to a second server when the first target configuration file is uploaded to the first server, wherein, the configuration file information comprises unique identification information of the first target configuration file.

In some embodiments, the effect rendering information comprises one or more of: a rendering type, a rendering level, first identification information representing whether the layer is visible, second identification information representing whether the layer is a mirror image, a layer rotation angle, a layer transparency, position coordinates of the layer, or a proportion of the rendering of the layer in a screen.

In some embodiments, the material resource information is configured for recording resource description information of the raw material; and the material resource information comprises: a material type and a material source.

In some embodiments, the trigger information comprises: a trigger type and a trigger action.

The above modules may be implemented as software components executing on one or more general-purpose processors, or may be implemented as hardware for performing certain functions, such as a programmable logic device and/or application specific integrated circuit. In some embodiments, these modules may be embodied in the form of a software product, which may be stored in non-volatile storage media. These non-volatile storage media include instructions causing a computer device (e.g., a personal computer, server, network device, a mobile terminal, etc.) to perform the method described in the embodiments of the present disclosure. In some embodiments, the above module may also be implemented on a single device or may be distributed on a plurality of devices. The functions of these modules may be combined with each other, or further divided into a plurality of sub-modules.

The specific details of each module or unit in the above apparatus have been described in detail in the corresponding method, and therefore are not repeated here.

It should be noted that, although several modules or units of the device for action execution are mentioned in the above detailed description, such a division is not mandatory. In practice, according to an embodiment of the present application, features and functions of two or more modules or units described above may be embodied in one module or unit. Conversely, features and functions of one module or unit described above may be further divided to be embodied by a plurality of modules or units.

In an exemplary embodiment of the present application, there is also provided an electronic device, comprising: a processor; and a memory for storing processor-executable instructions, the processor being configured to execute the above method for generating configuration file for image edition or the image editing method in this exemplary embodiment.

Figure 6:
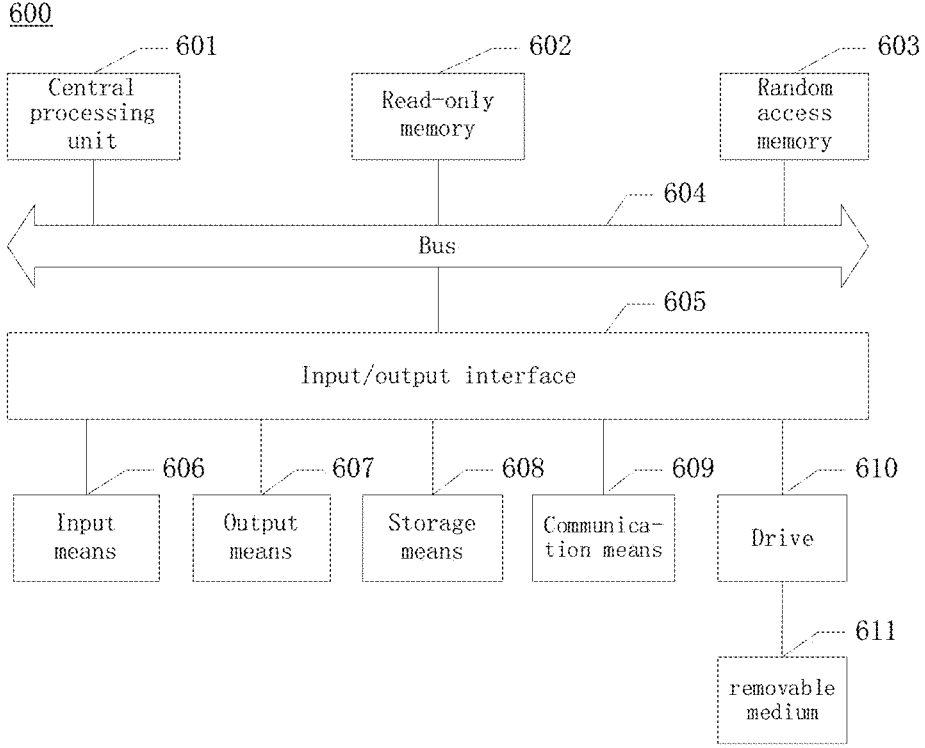
FIG. 6 is a schematic structural diagram of an electronic device according to some embodiments of the present application.

FIG. 6 is a schematic structural diagram of an electronic device according to some embodiments of the present application. It should be noted that, the electronic device 600 shown in FIG. 6 is only an example, and should not bring any limitation to the functions and the usage scope of some embodiments of the present application.

As shown in FIG. 6, the electronic device 600 includes a central processing unit (CPU) 601 that can perform various appropriate actions and processes according to a program stored in a read-only memory (ROM) 602 or a program loaded from a storage means 608 into a random access memory (RAM) 603. In the RAM 603, various programs and data required for system operation are also stored. The central processing unit 601, ROM 602, and RAM 603 are connected to each other via a bus 604. An input/output (I/O) interface 605 is also connected to the bus 604.

The following components are connected to the I/O interface 605: an input means 606 including a keyboard, a mouse, and the like; an output means 607 including such as a cathode ray tube (CRT), a liquid crystal display (LCD), a speaker and the like; a storage means 608 including a hard disk and the like; and a communication means 609 including a network interface card such as a local area network (LAN) card, and a modem. The communication means 609 performs communication processing via a network such as the Internet. A drive 610 is also connected to the I/O interface 605 as needed. A removable medium 611 such as a magnetic disk, an optical disk, a magneto-optical disk, and a semiconductor memory, is mounted on the drive 610 as needed, so that a computer program read out therefrom is installed in the storage means 608 as needed.

In particular, according to an embodiment of the present application, the processes described above with reference to the flow diagrams may be implemented as a computer software program. For example, an embodiment of the present application includes a computer program product, which comprises a computer program carried on a computer-readable medium, the computer program comprising program code for performing the method illustrated by the flow diagrams. In such an embodiment, the computer program may be downloaded and installed from a network through the communication means 609 and/or installed from the removable medium 611. When the computer program is executed by the central processing unit 601, various functions defined in the apparatus of the present application are executed.

In some embodiments of the present application, there is further provided a computer-readable storage medium having thereon stored a computer program which, when executed by a processor, implements the above method for generating configuration file for image edition or the image editing method.

It should be noted that the computer-readable storage medium shown in the present application can be, for example, but not limited to, an electronic, magnetic, optical, electromagnetic, infrared, or semiconductor system, apparatus, or device, or any combination of the above. More specific examples of the computer-readable storage medium may include, but are not limited to: an electrical connection having one or more wires, a portable computer diskette, a hard disk, a random access memory, a read-only memory, an erasable programmable read-only memory (EPROM or flash memory), an optical fiber, a portable compact disc read-only memory (CD-ROM), an optical storage device, a magnetic storage device, or any suitable combination of the foregoing. In the present application, the computer-readable storage medium may be any tangible medium containing or storing a program, wherein the program can be used by or in conjunction with an instruction execution system, apparatus, or device. Program code contained on the computer-readable storage medium may be transmitted using any appropriate medium, including but not limited to: wireless, wire, optical cable, radio frequency, etc., or any suitable combination of the foregoing.

In some embodiments of the present application, there is also provided a computer program product which, when run on a computer, causes the computer to execute the above method for generating configuration file for image edition or image editing method.

In some embodiments of the present application, there is also provided a computer program, comprising instructions which, when executed by a processor, cause the processor to implement the above method for generating configuration file for image edition or image editing method.

It should be noted that, relational terms such as "first" and "second", herein, are only used for distinguishing one entity or operation from another entity or operation without necessarily requiring or implying any such actual relation or order between these entities or operations. Moreover, the term "comprise", "include", or any other variation thereof, is intended to encompass a non-exclusive inclusion, such that a process, method, article, or device comprising a list of elements not only includes those elements but also includes other elements not expressly listed, or also includes elements inherent to such a process, method, article, or device. Without more limitations, an element defined by a statement "comprising a . . . " does not exclude the presence of another identical element in a process, method, article, or device that includes the element.

The above only describes the specific embodiments of the present application, which enable those skilled in the art to understand or implement the present application. Various modifications to these embodiments will be apparent to those skilled in the art, and the general principles defined herein may be implemented in other embodiments without departing from the spirit or scope of the present application. Therefore, the present application will not be limited to these embodiments described herein, but conform to the widest scope consistent with the principles and novel features disclosed herein.

What is claimed is:

1. A method for generating configuration file for image edition, applied to a shooting application, comprising:
    in response to a creation operation, displaying a creation interface, the creation interface comprising a preset material set for generating a configuration file;
    in response to a material selection operation, selecting one or more raw materials from the material set, wherein, layer information of a layer corresponding to a single one of the raw material comprises: effect rendering information, material resource information and trigger information, the effect rendering information being configured for recording key information in rendering the raw material, and the trigger information being configured for recording control information of triggering displaying or hiding the layer corresponding to the raw material;
    in response to an editing operation for the raw material, editing the layer information of the layer corresponding to the raw material, generating a first target material, and rendering and displaying layer information of a layer corresponding to the first target material; and
    in response to a generation operation, on the basis of the layer information of the layer corresponding to the first target material, generating a first target configuration file for image edition, the first target configuration file being configured for rendering the layer information of the layer corresponding to the first target material on a shot image.

2. The method according to claim 1, wherein the method further comprises:
    in response to a publishing operation of a user for the first target configuration file, uploading the first target configuration file to a first server, wherein, the first target configuration file is configured for being downloaded by another user and rendering the layer information of the layer corresponding to the first target material on an image shot by the other user.

3. The method according to claim 2, wherein the method further comprises:
    storing the layer information of the layer corresponding to the first target material into a target project file; and
    in response to the publishing operation of the user for the first target configuration file, uploading the target project file to the first server, wherein, the target project file is configured for being downloaded by the other user and editing the layer information of the layer corresponding to the first target material into layer information of a layer corresponding to a second target material to generate a second target configuration file.

4. The method according to claim 3, wherein the target project file comprises: an effect rendering file, a resource information file and a trigger information file,
    wherein, the effect rendering file is configured for storing effect rendering information of the first target material, the resource information file is configured for storing material resource information of the first target material, and the trigger information file is configured for storing trigger information of the first target material.

5. The method according to claim 3, wherein the target project file comprises original storage path information of the first target material,
    wherein, the original storage path information is configured for being updated to local storage path information after the target project file is downloaded by the other user.

6. The method according to claim 2, wherein the method further comprises:
    when the first target configuration file is uploaded to the first server, uploading configuration file information corresponding to the first target configuration file to a second server,
    wherein, the configuration file information comprises unique identification information of the first target configuration file.

7. The method according to claim 1, wherein the effect rendering information comprises one or more of: a rendering type, a rendering level, first identification information representing whether the layer is visible, second identification information representing whether the layer is a mirror image, a layer rotation angle, a layer transparency, position coordinates of the layer, or a proportion of the rendering of the layer in a screen.

8. The method according to any of claim 1, wherein the material resource information is configured for recording resource description information of the raw material; and
    the material resource information comprises: a material type and a material source.

9. The method according to claim 1, wherein the trigger information comprises: a trigger type and a trigger action.

10. An image editing method, comprising:
    in response to a downloading operation for a first target configuration file, downloading the first target configuration file from a first server, wherein, the first target configuration file is generated by editing layer information of a layer corresponding to a raw material into layer information of a layer corresponding to a first target material, the layer information corresponding to a single one of the raw material comprising: effect rendering information, material resource information and trigger information, the effect rendering information being configured for recording key information in rendering the raw material, and the trigger information being configured for recording control information of triggering displaying or hiding the layer corresponding to the raw material; and
    rendering the layer information of the layer corresponding to the first target material on a shot image by using the first target configuration file.

11. The method according to claim 10, wherein
    after downloading the first target configuration file from the first server, in response to a modification operation for the first target configuration file, downloading a target project file from the first server to display the first target material on a creation interface, the target project file having therein stored the layer information of the layer corresponding to the first target material, in response to an editing operation for the first target material, editing the layer information of the layer corresponding to the first target material, generating a second target material, and rendering and displaying layer information of a layer corresponding to the second target material; and in response to a generation operation, on the basis of the layer information of the layer corresponding to the second target material, generating a second target configuration file.

12. An electronic device, comprising: a memory and a processor, the processor being configured to execute a computer program stored in the memory, the computer program, when executed by the processor, implementing the method for generating configuration file for image edition according to claim 1.

13. A non-transitory computer-readable storage medium having thereon stored a computer program which, when executed by a processor, implements a method for generating configuration file for image edition comprising:

in response to a creation operation, displaying a creation interface, the creation interface comprising a preset material set for generating a configuration file;

in response to a material selection operation, selecting one or more raw materials from the material set, wherein, layer information of a layer corresponding to a single one of the raw material comprises: effect rendering information, material resource information and trigger information, the effect rendering information being configured for recording key information in rendering the raw material, and the trigger information being configured for recording control information of triggering displaying or hiding the layer corresponding to the raw material;

in response to an editing operation for the raw material, editing the layer information of the layer corresponding to the raw material, generating a first target material, and rendering and displaying layer information of a layer corresponding to the first target material; and in response to a generation operation, on the basis of the layer information of the layer corresponding to the first target material, generating a first target configuration file for image edition, the first target configuration file being configured for rendering the layer information of the layer corresponding to the first target material on a shot image.

14. The non-transitory computer-readable storage medium according to claim 13, wherein the method further comprises:

in response to a publishing operation of a user for the first target configuration file, uploading the first target configuration file to a first server, wherein, the first target configuration file is configured for being downloaded by another user and rendering the layer information of the layer corresponding to the first target material on an image shot by the other user.

15. The non-transitory computer-readable storage medium according to claim 14, wherein the method further comprises:

storing the layer information of the layer corresponding to the first target material into a target project file; and in response to the publishing operation of the user for the first target configuration file, uploading the target project file to the first server, wherein, the target project file is configured for being downloaded by the other user and editing the layer information of the layer corresponding to the first target material into layer information of a layer corresponding to a second target material to generate a second target configuration file.

16. The non-transitory computer-readable storage medium according to claim 15, wherein the target project file comprises: an effect rendering file, a resource information file and a trigger information file, wherein, the effect rendering file is configured for storing effect rendering information of the first target material, the resource information file is configured for storing material resource information of the first target material, and the trigger information file is configured for storing trigger information of the first target material.

17. The non-transitory computer-readable storage medium according to claim 15, wherein the target project file comprises original storage path information of the first target material, wherein, the original storage path information is configured for being updated to local storage path information after the target project file is downloaded by the other user.

18. The non-transitory computer-readable storage medium according to claim 14, wherein the method further comprises:

when the first target configuration file is uploaded to the first server, uploading configuration file information corresponding to the first target configuration file to a second server, wherein, the configuration file information comprises unique identification information of the first target configuration file.

19. An electronic device, comprising: a memory and a processor, the processor being configured to execute a computer program stored in the memory, the computer program, when executed by the processor, implementing the image editing method according to claim 10.

20. A non-transitory computer-readable storage medium having thereon stored a computer program which, when executed by a processor, implements the image editing method according to claim 10.

* * * * *